United States Patent
Gu et al.

(10) Patent No.: US 8,717,960 B2
(45) Date of Patent: May 6, 2014

(54) MCBCS MAPPING AND DELIVERY TO SUPPORT MCBCS SERVICES

(75) Inventors: Liang Gu, Shanghai (CN); Limei Wang, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 1001 days.

(21) Appl. No.: 12/253,649

(22) Filed: Oct. 17, 2008

(65) Prior Publication Data

US 2009/0103466 A1 Apr. 23, 2009

Related U.S. Application Data

(60) Provisional application No. 60/981,097, filed on Oct. 18, 2007.

(51) Int. Cl.
*H04H 20/71* (2008.01)

(52) U.S. Cl.
USPC ........................................... 370/312; 370/319

(58) Field of Classification Search
None
See application file for complete search history.

(56) References Cited

U.S. PATENT DOCUMENTS

| | | | |
|---|---|---|---|
| 2004/0039839 A1* | 2/2004 | Kalyanaraman et al. | 709/238 |
| 2006/0239264 A1* | 10/2006 | Kang et al. | 370/390 |
| 2006/0239265 A1 | 10/2006 | Son et al. | |
| 2007/0230351 A1 | 10/2007 | Dang | |
| 2007/0253367 A1 | 11/2007 | Dang et al. | |
| 2008/0008176 A1 | 1/2008 | Lim et al. | |
| 2008/0049941 A1 | 2/2008 | Kim et al. | |
| 2008/0056219 A1* | 3/2008 | Venkatachalam | 370/342 |
| 2008/0089265 A1* | 4/2008 | Park et al. | 370/312 |
| 2008/0101333 A1 | 5/2008 | Semper | |
| 2008/0175238 A1 | 7/2008 | Venkatachalam | |
| 2008/0212509 A1 | 9/2008 | Kim et al. | |
| 2008/0240097 A1 | 10/2008 | Kim et al. | |
| 2008/0259835 A1* | 10/2008 | Venkatachalam et al. | 370/311 |
| 2009/0046637 A1 | 2/2009 | Kim et al. | |

FOREIGN PATENT DOCUMENTS

WO WO 2008/017272 A1 2/2008

OTHER PUBLICATIONS

Li, K-H., "Wimax Network Architecture," Intel, Wimax Solutions Division, Jun. 5, 2006, 19 pages.
"Part 16: Air Interface for Fixed and Mobile Broadband Wireless Access Systems, Amendment for Physical and Medium Access Control Layers for Combined Fixed and Mobile Operation in Licensed Bands," IEEE P802.16e, D12, Oct. 14, 2005, pp. 1-658, Institute of Electrical and Electronics Engineers, Inc., New York, NY.
"Annex A: IEEE 802.16 MCBCS Synchronization Support (informative)," Oct. 14, 2005, 4 pages.

(Continued)

*Primary Examiner* — David Oveissi
(74) *Attorney, Agent, or Firm* — Slater & Matsil, L.L.P.

(57) ABSTRACT

A method and system for multicast and broadcast system (MCBCS) mapping and delivery to support MCBCS services is provided. Media content flows are assigned a media content identifier grouped into one or more multicast and broadcast system (MBS) services, wherein each MBS service is assigned an MBS service ID. An MBS content ID (MCID) is assigned to each MBS service. Data packets are formed that include the MBS service information (e.g., the media content flows) and classification/synchronization rules. A data path ID (DPID) is assigned to one or more MBS services dependent upon the destination of the data packets. Frames for transmission are then created and transmitted via radio frequencies. Optionally, a logical channel ID (LCID) may be assigned to each media content flow, if more than one media content flow is included within an MBS service.

19 Claims, 5 Drawing Sheets

(56) References Cited

OTHER PUBLICATIONS

"MBS Architecture and Framework Scope, Major Processes," Proposal for Rel. 1.5, Alvarion, May 2007, 16 pages, Wimax Forum.

Ergen, M., "The Access Service Network in WiMAX: the Role of ASN-GW," WiChorus, Inc., Oct. 29, 2007, 15 pages.

"MCBCS Synchronous Transmission Support over WiMAX Network," Part of Network Release 1.5, Draft, Jan. 2006, pp. 1-38.

* cited by examiner

MCBCS MAPPING AND DELIVERY TO SUPPORT MCBCS SERVICES

This application claims the priority benefit of commonly owned U.S. Provisional Patent Application having Ser. No. 60/981,097 entitled, "Method and System for MCBCS Mapping and Delivery to Support MCBCS Services," filed on Oct. 18, 2007, which is hereby incorporated by reference.

TECHNICAL FIELD

This invention relates generally to communications systems and, more particularly, to multicast and broadcast systems.

BACKGROUND

Multicast and broadcast Service (MCBCS) is an optional feature, which refers to a network's ability to provide flexible and efficient mechanisms of sending common (the same) information content to multiple users using shared radio resources. When available and appropriate, this may use the MBS framework of the IEEE 802.16e standard. The MBS framework may be used to offer real-time streaming applications or non-real time file transfer/download for store and play usage. The type of information transmitted may be any type of data, e.g., text, multimedia (e.g., voice), and streaming media. The MBS may deliver content to MBS user groups, based on local policy and subscription. The multicast groups membership can be static or dynamic in that users can join and leave groups at any time. By using multicast and broadcast services, it will greatly save resources and by supporting macro diversity and the ability of the mobile station (MS) to receive data while in an idle mode, the MS may reduce power requirements.

In order to support multicast and broadcast service (MCBCS) with macro diversity supported, and also a MS can receive data during the idle mode, the following mapping and delivery mechanisms are flexible and necessary for a MS to receive data while giving an operator greater flexibility to control the contents.

SUMMARY OF THE INVENTION

These and other problems are generally solved or circumvented, and technical advantages are generally achieved, by preferred embodiments of the present invention which provides mapping and delivery for multicast and broadcast services.

In an embodiment of the present invention, a method of processing a multicast and broadcast packet flow in an access services network gateway is provided. A multicast and broadcast service (MCBCS) packet flow and a MBS service ID associated with the MBS packet flow are received. A multicast connection ID (MCID) and a data path ID (DPID) are assigned to the packet flow.

In another embodiment of the present invention, another method of processing a multicast and broadcast packet flow in an access services network gateway is provided. A MBS packet flow is received and a MBS service ID associated with the MBS packet flow is assigned. A multicast connection ID (MCID) associated with the packet flow and a data path ID (DPID) are also assigned.

In yet another embodiment of the present invention, a method of processing a multicast and broadcast packet flow in a content services network gateway is provided. One or more content flows are received and grouped into a first group of content flows. A MBS service ID associated with the MBS packet flow is assigned and packets are created. The packets are transmitted to an access services network.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
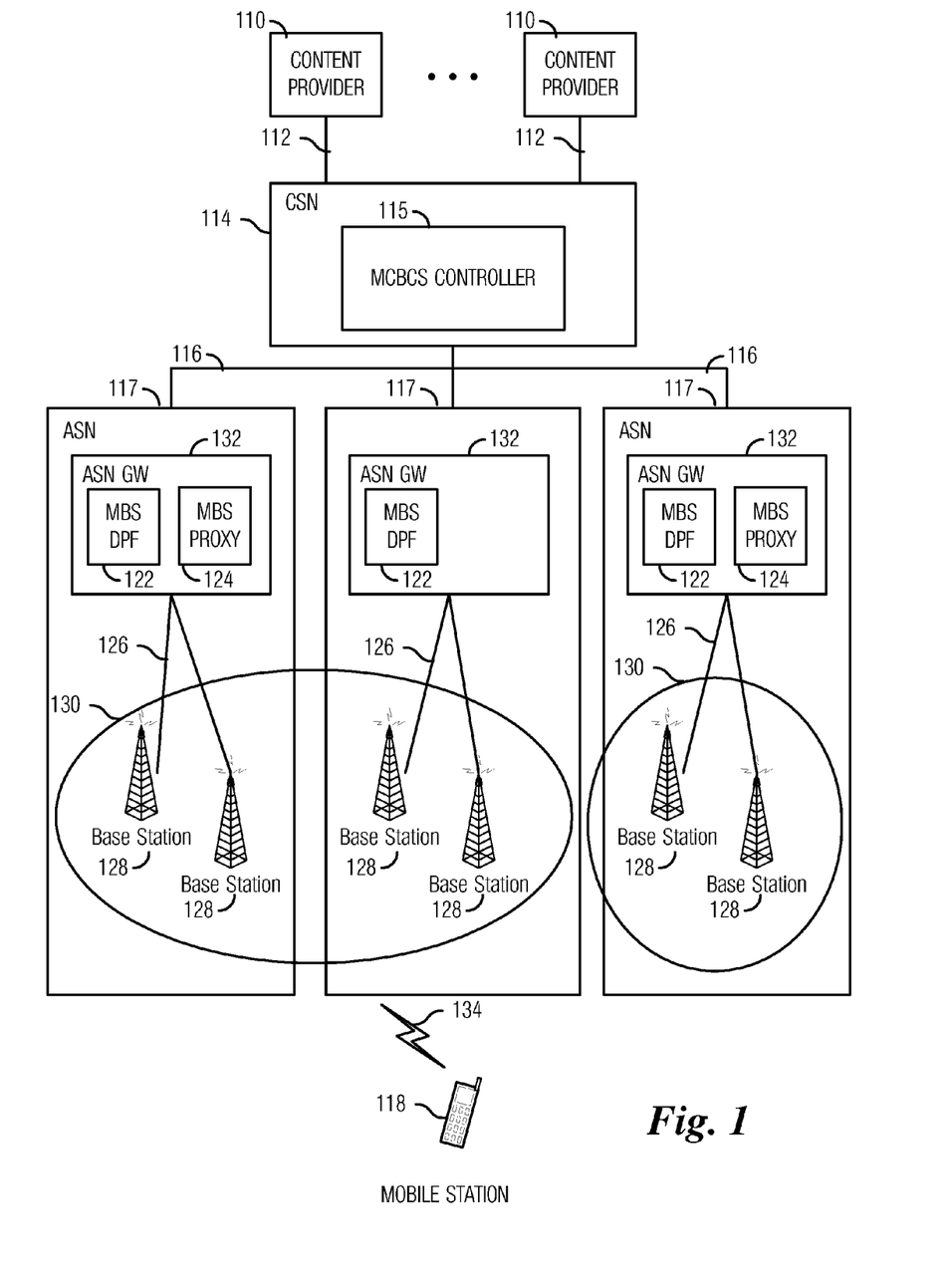
FIG. 1 is a multicast and broadcast system (MBS) network diagram embodying features of the present invention.

FIG. 1 is a multicast and broadcast system (MCBCS) network diagram embodying features of the present invention. Content providers 110 provide content media flows 112 to a connectivity services network (CSN) 114. A MCBCS controller 115 within the CSN 114 provides a control function and acts to receive and group the individual content media flows 112 into one or more MBS services 116.

The MBS services 116 are provided to one or more access services networks (ASNs) 117, which provide network access services to mobile stations 118. In particular, the MBS services 116 are provided to an ASN gateway (ASN GW) 132, which generally provides interconnectivity capabilities and network functions for the mobile users, including providing relay services for IP connectivity, radio resource management, multicast and broadcast control intra-ASN mobility, inter-ASN mobility, paging and location management, authentication and authorization capabilities, accounting, quality of service, and the like. The ASN GW 132 may also assign a service ID, setup the MBS data path, and perform synchronization for the MBS.

In an embodiment, the ASN GW 132 includes an MBS distributed data path function (MBS Distributed DPF) 122 and an MBS proxy 124. Generally, the MBS proxy 124 is a signaling plane entity that allocates, manages, and maintains resources/resource identifiers within each MBS zone, and the MBS Distributed DPF 122 is in the data path and establishes and maintains MBS data transport between the CSN 114 and the mobile stations 118. Each MBS zone preferably has a single MBS proxy 124. If the service continuity and/or overlapping zone management is needed, one MBS proxy may manage more than one MBS zone. FIG. 1 shows the case that the MBS proxy only need to manage its own MBS zone.

The ASN GW 132 provides data packets 126 that include the content media flows 112 to base stations 128 within one or more MBS zones 130. As will be discussed in greater detail below, each content media flow 112 may be identified as being sent to one or more specific MBS zones 130. The ASN GW 132 transmits the data packets 126 to an MBS agent within each base station (the base station and the MBS agent are collectively referred by reference numeral 128) within each MBS zone 130 that the content media flow 112 is to be sent via radio frequencies 134.

It should be noted that the network diagram illustrated in FIG. 1 is provided for illustrative purposes only in the context of preferred embodiments of the present invention, and as a result, the network diagram does not show all of the elements that may be present in a multicast and broadcast system. For example, the MBS network may include an authentication, authentication and accounting (AAA) server, location registers, multicast router, and the like. Furthermore, each element may include additional components. For example, the ASN GW may include a handover function, a context function, an AAA client, a radio resource management function, a paging controller, a location register, a key distributor, an upper sync executer, a synchronization controller, and the like, and the CSN may include an AAA function, a Policy Function (PF), a DHCP Server, and the like. Additional information regarding these elements, and other elements in the network, may be found in IEEE 802.16 standard, which is incorporated herein by reference.

Figure 2:
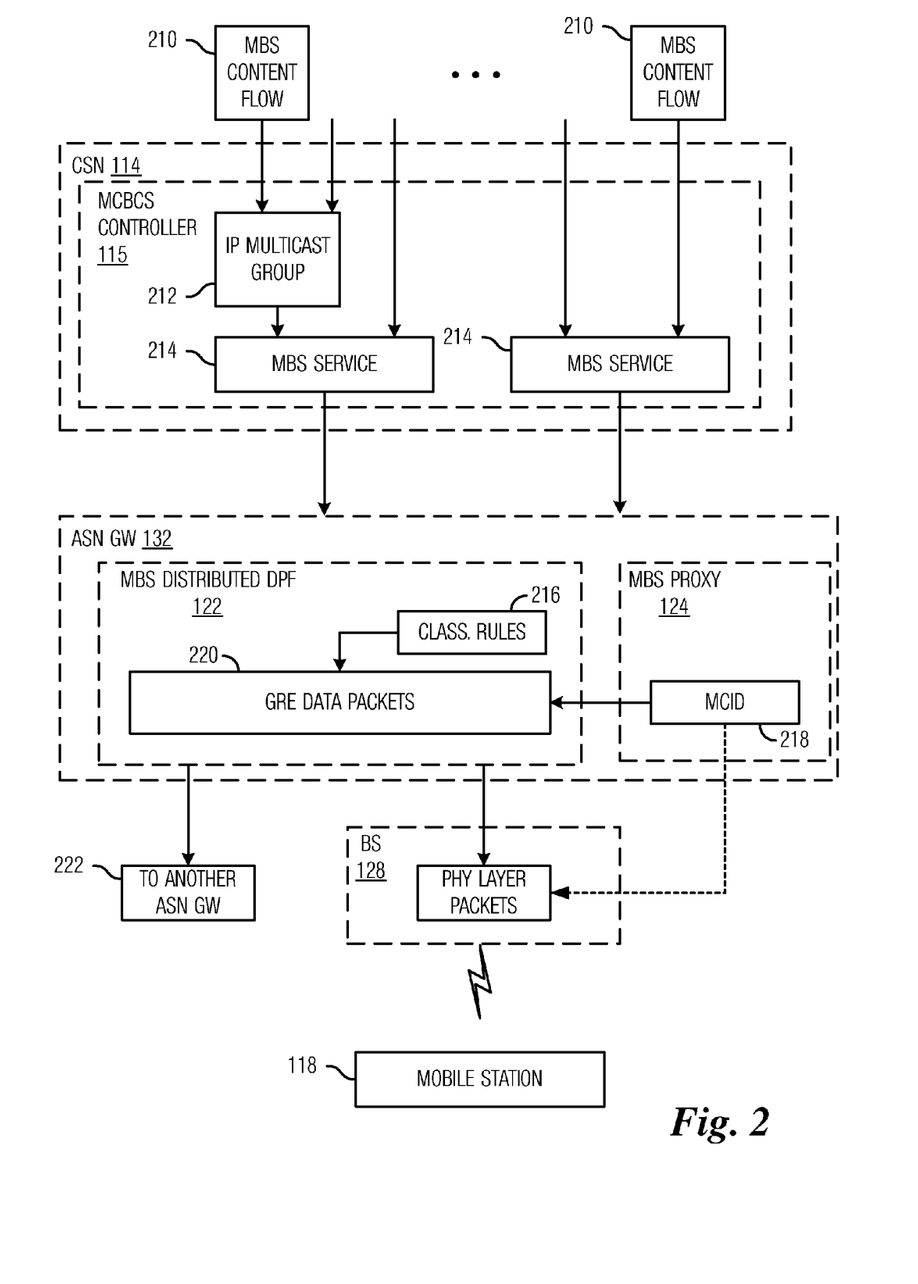
FIG. 2 is diagram illustrating the data flowing through an MBS in accordance with an embodiment of the present invention.

Referring now to FIG. 2, a data diagram is shown that illustrates the flow of media content through an MBS system such as that shown in FIG. 1, in accordance with an embodiment of the present invention. A more detailed explanation of the process or method will be discussed below with reference to FIG. 3.

Initially, one or more MBS content flows 210 are received from one or more content providers, such as content providers 110 illustrated in FIG. 1. The MBS content flows 210 may represent any type of data, including voice, data, video, music, or the like. One or more of the MBS content flows 210 may be grouped into an IP multicast group 212, and one or more of the IP multicast groups 212 and/or one or more of the MBS content flows 210 may be grouped into an MBS service 214. Generally, IP multicast groups 212 and/or MBS content flows 210 may be grouped into an MBS service 214 if they share common quality of service (QoS) requirements, destination, and the like. It should be noted that while FIG. 2 illustrates that the MBS service 214 comprises multiple MBS content flows 210 (either individually or in combination with an IP multicast group 212) the MBS service 214 may include only a single MBS content flow 210.

For example, each MBS content flow 210 may represent a single music or video station (e.g., ABC, NBC, CBS, CNN, etc.). The MBS content flows 210 of the single music or video stations may be grouped together as an MBS service 214, such as a grouping of sports stations, news stations, movie stations, or the like. In this example, the MBS content flows 210 (e.g., the news stations such as CNN, MSNBC, etc.) have the same QoS requirements and may be grouped together as a single MBS service 214.

As will be explained in greater detail below, each MBS content flow 210 is assigned a unique content flow identifier, and each MBS service 214 is assigned a unique MBS service identifier. In an embodiment, unique IP 5-tuples are used to identify each MBS content flow 210, though other identifiers may be used. The MBS service identifier may be any unique string or number, including an IP 5-tuple.

The MBS services 214 are provided to the ASN GW 132. Given the MBS services 214, the MBS proxy 124 may determine synchronization rules 216, if synchronization is supported, and assign a multicast channel identifier (MCID) 218. The MCID uniquely identifies each MBS service, wherein a 1:1 relationship exists between the MCID and the MBS service identifier. The MCID provides a low level identifier for transmission and reception of the MBS services, while the MBS service identifier is a high- or application-level identifier and can be assigned by the network. The MCID will be used by the mobile station to identify the MAC PDU for a particular MBS service in, for example, a MBS region or a MBS permutation zone.

The MBS proxy 124 also triggers the MBS Distributed DPF to create a data path, using the information from the MBS Proxy 124 to determine the classification rules. The MBS DPF 122 using the classification rules 216 to classify the packets received from CSN, and creates generic routing encapsulation (GRE) data packets 220 that include the MBS content flow 210 for each MBS service 214. Preferably, the GRE data packets 220 are sent to another ASN GW (indicated by reference numeral 222) and/or to the base station 128.

The MBS services 214 are then encapsulated into PHY-level frames and transmitted via radio frequencies to mobile stations 118. The encapsulated information includes Multicast connection identifier (MCID) 218 from the MBS proxy 124. Optionally, the encapsulated and transmitted data may also include a logical channel identifier (LCID). The LCID uniquely identifies the individual channels within the MBS service flow. For example, with reference to the above example, the MCID may identify a sports programming service that includes a plurality of individual sports channels, while the LCID identifies the individual sports channels (e.g., ESPN, Golf Channel, NFL Network, racing channel, and the like).

Mobile stations receive the transmitted data and identifier information. Generally, identifier information, including MCID, LCID, MBS zone ID, MBS_MAP, MBS_MAP_IE, and the like. Using the MCID, LCID, MBS zone ID, MBS_MAP, and MBS_MAP_IE information, the mobile station is able to receive, locate, and reassemble the MBS content flows for use by the mobile user.

It should be noted that FIG. 2 illustrates the packaging of the MBS content flows 210 received from the content providers as the content flows are transmitted through the MBS system. One of ordinary skill in the art will realize that other functions may also be performed independent of the actual data, such as, for example, the creation of a data path. In this example, MBS Distributed DPF 122 has a function that creates a data path with classification rules. This process may be triggered by the MBS Proxy 124 when the MBS Proxy assigns an MCID 218.

The data path creation does not need to wait until the ASN GW receives the data from CSN. Rather, the data path and MCID can be preconfigured, or it may be triggered by other events. For example, a first MS wants to receive an MBS service. After authorization, the MS may notify the MBS Proxy with some of the service information, causing the MBS proxy to assign the MCID and send a trigger to the MBS Distributed DPF. The MBS Distributed DPF, based on the information it gets from the MBS Proxy, begins the data path creation procedure with the classification rules.

Figure 3:
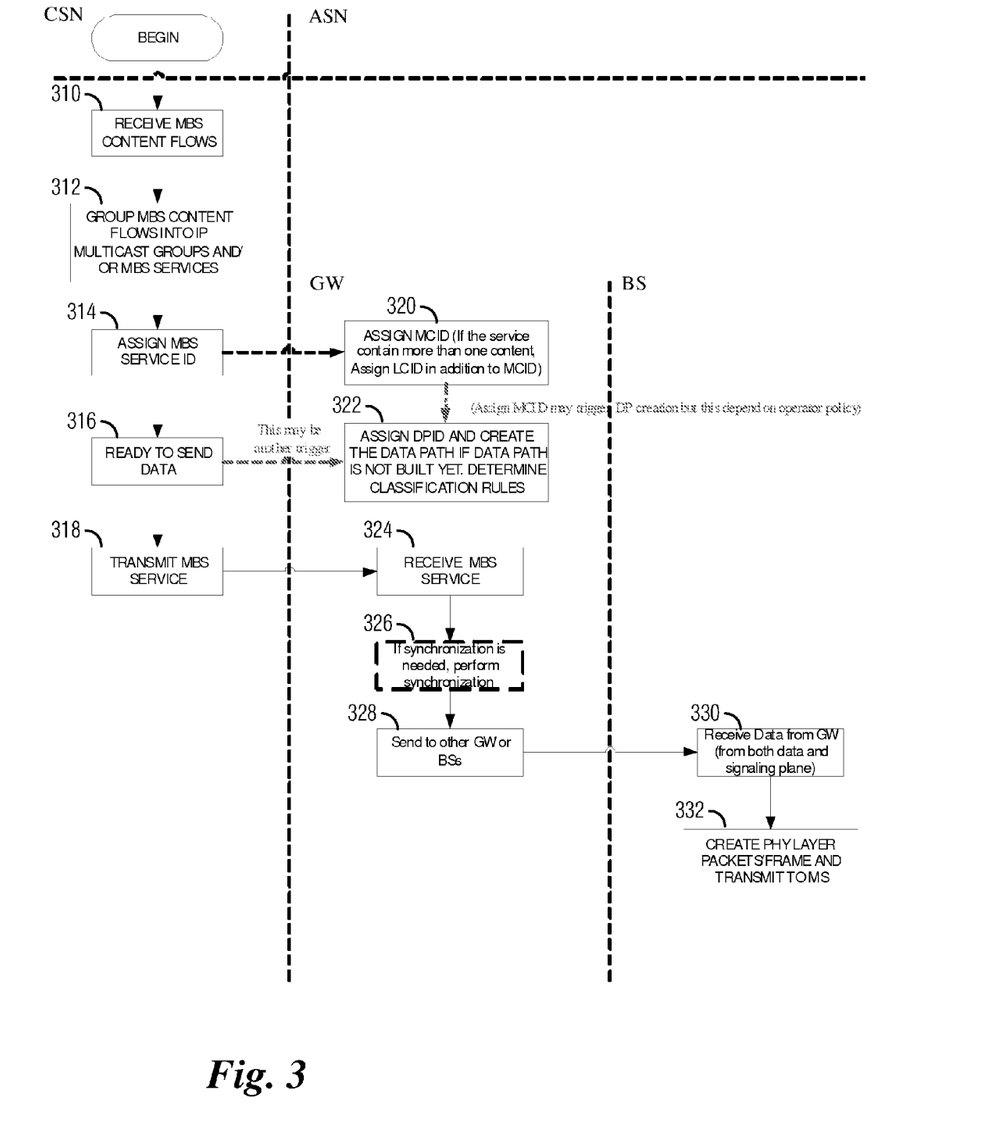
FIG. 3 is a diagram illustrating a method of transmitting media content flows in accordance with an embodiment of the present invention.

FIG. 3 illustrates a method that may be used to transmit content media flows to mobile stations in an MBS system in accordance with an embodiment of the present invention. It should be noted that the processes described below are provided with reference to particular network elements and functions within the particular network elements for illustrative purposes only. Accordingly, it should be understood that the processing discussed herein may be distributed to other components and/or other functions within the other components.

The process begins in step 310, wherein one or more content flows are received by the CSN, and more preferably by the MCBCS controller within the CSN, and are assigned a unique content identifier for each content flow. The unique content identifier may be unique within each MBS zone or unique across MBS zones. In an embodiment, IP 5-tuples are used to uniquely identify each content flow, but other identification schemes may be used.

Next, in step 312, the MCBCS controller groups the individual content flows into one or more IP multicast groups, each of which may further be combined with other IP multicast groups and/or content flows to create one or more MBS services. As noted above, an MBS service may include content flows that have the same QoS and destination requirements, and in step 314, each MBS service is assigned a unique MBS service identifier, wherein the MBS service identifier is unique in MBS transmission zone. At this point, the CSN is ready to begin transmitting the MBS service flows as indicated by step 316 and then begins to transmit the MBS service flows, identified by the MBS service identifier, to the ASN as indicated by step 318.

In this embodiment, step 320, the MBS service identifier is provided to the ASN gateway, preferably the MBS Proxy within the ASN gateway. Upon receipt of the MBS service information such as service ID or multicast IP address, and the like, the ASN gateway assigns a MBS channel identifier (MCID) and, if the MBS service has multiple flows, a logical channel identifier (LCID) will be assigned correspondingly, as illustrated in step 320. The MCID and LCID may be determined by any feasible method, but are preferably unique for each MBS service. As discussed above, the MCID is used by the transmitter and the receiver to identify the MBS MAC PDU in a MBS region or permutation zone within the transmitted frame, and the LCID is used to identify the individual channels within the MBS service flow.

In step 322, the ASN gateway, preferably the MBS Distributed DPF, assigns a data path identifier (DPID) and creates the data path. If multiple MBS services are being delivered to the same MBS zone, each of the MBS services may be assigned the same DPID. That is, the DPID may have a 1:1 relationship with the MBS zone to which the MBS service is being sent from a particular ASN GW. This step may be triggered by either the assignment of the MCID by the ASN or other internal trigger, or an indication that the CSN is ready to begin transmitting the MBS service flows.

It should be noted that the assignment of the MCID and the LCID, and hence the assignment of the DPID and the creation of the data path, may be triggered by the CSN or the ASN. The ASN triggering the assignment of the MCID may arise in the situation in which a mobile station user is the first user to request an MBS service in the MBS zone. In this case, the request from the mobile station may trigger the creation of the data path to be created while the MBS service flows are being created.

The ASN gateway, e.g., the MBS Proxy, receives the MBS service in step 324 and, optionally, performs synchronization if necessary in step 326.

Thereafter, in step 328, the ASN GW, e.g., the MBS Distributed DPF, encapsulates the MBS service data (e.g., the original IP raw packet from the CSN, packets containing the MBS region payload, or the like), into GRE data packets in preparation for transmission. In a preferred embodiment, the MBS Distributed DPF creates GRE tunnels to a base station or to a GW first then forward to a base station for transmission to mobile stations.

In step 330, the MBS agent within each base station receives the GRE data packets. Next, in step 332, the MBS agent prepares PHY layer packets and transmits those packets to the mobile station via radio frequencies.

Figure 4:
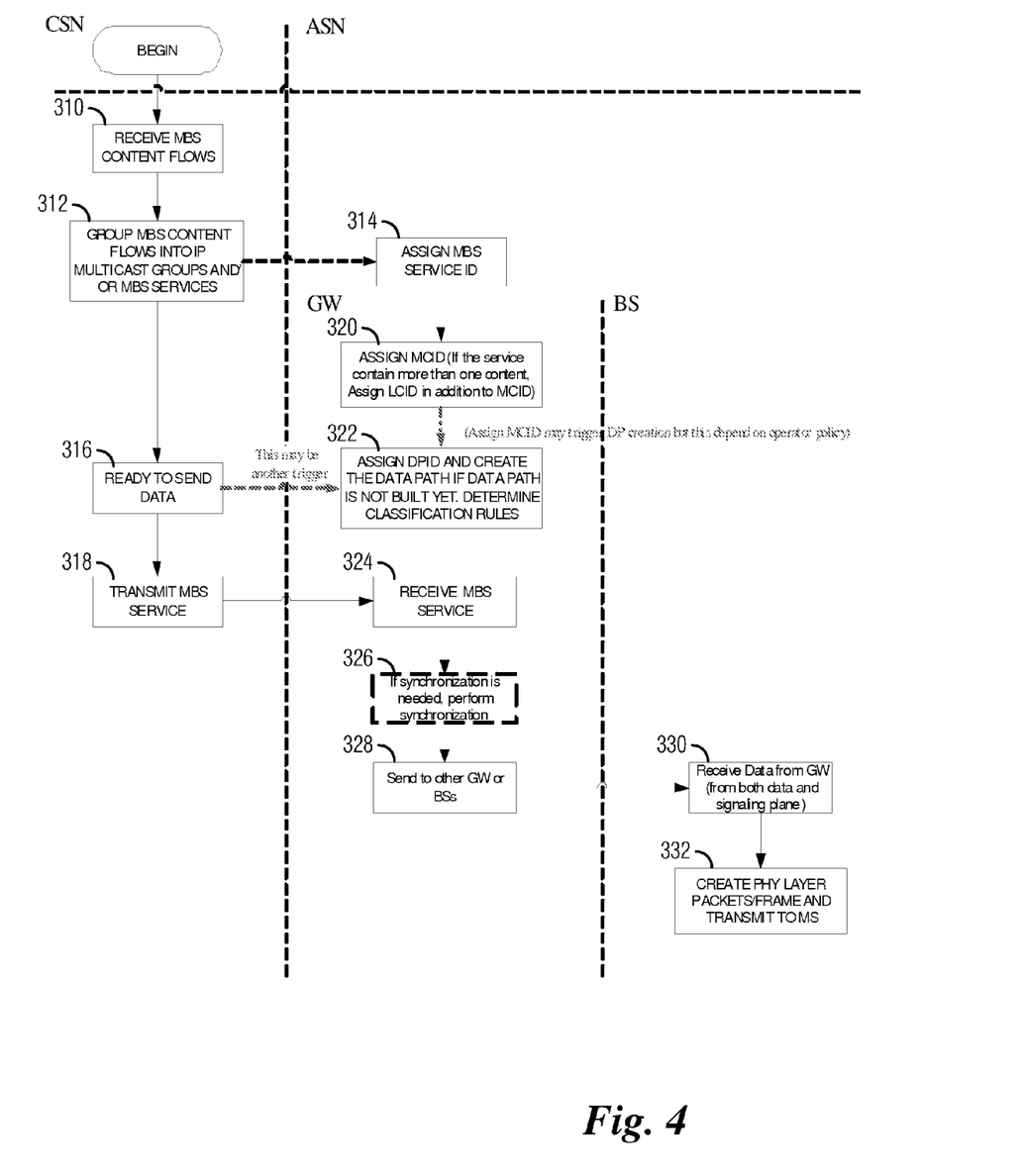
FIG. 4 is a diagram illustrating another method of transmitting media content flows in accordance with an embodiment of the present invention.

FIG. 4 illustrates another method that may be used to transmit content media flows to mobile stations in an MBS system in accordance with an embodiment of the present invention. This method is similar to the method discussed above with reference to FIG. 3, wherein like reference numerals refer to like processes, unless otherwise noted.

It should be appreciated that the method illustrated in FIG. 4 differs from the method illustrated in FIG. 3 in that the MBS service ID in step 314 is performed by the ASN in FIG. 4 as opposed to the CSN in FIG. 3.

Figure 5:
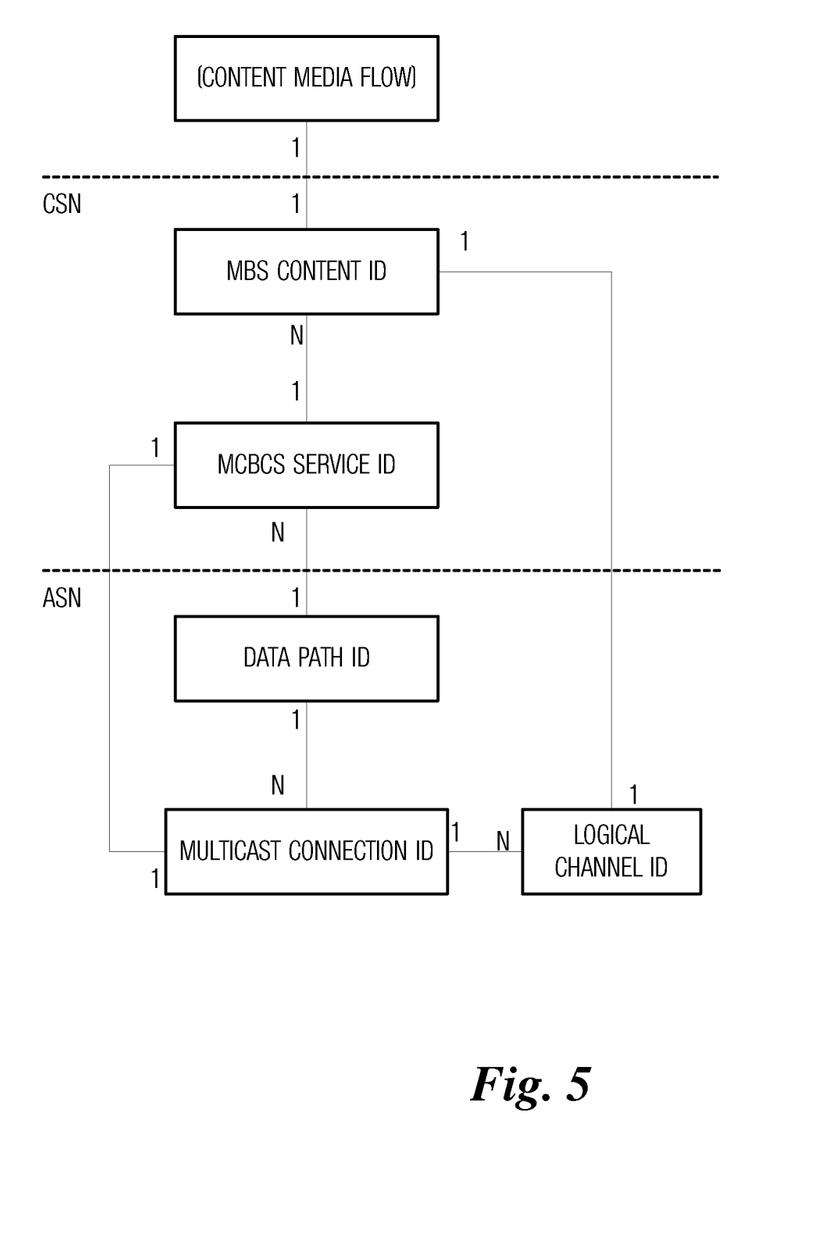
FIG. 5 is a relationship diagram illustrating the relationship between the identifiers in accordance with an embodiment of the present invention.

FIG. 5 summarizes and graphically illustrates the various identifiers and the relationship therebetween in accordance with an embodiment of the present invention, wherein N is equal to or greater than 1. Each MBS content flow is identified by a unique MBS content ID, such as an IP 5-tuple, thus, the relationship between the MBS content flow and the MBS content ID is 1:1.

The MBS service is identified by an MBS service ID, wherein each MBS service may contain one or more MBS content flows (and/or one or more IP multicast groups). Thus, the MBS service ID has a 1:N relationship to the MBS content ID.

All MBS services being transmitted to the same MBS zone may have the same DPID, and accordingly, the DPID has a 1:N relationship to the MBS service ID.

The data path identified by the DPID has 1:N relationship to the MCID.

The MCID provides a low-level identifier for each service and has a 1:1 relationship with the MBS service identifier. The (optional) LCID, which is used to identify the individual channels within the MBS service (and MCID), has an N:1 relationship with the MCID.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of processing a multicast and broadcast service (MCBCS) packet flow in an access services network gateway, the method comprising:
   receiving the MBS packet flow;
   receiving a MBS service ID associated with the MBS packet flow;
   receiving a MBS content ID associated with a MBS content in the MBS packet flow;

assigning a multicast connection ID (MCID) to the MBS packet flow, wherein the MCID has a 1:1 correspondence with the MBS service ID; and assigning a data path ID (DPID) to the MBS packet flow.

2. The method of claim 1, further comprising creating a data path.

3. The method of claim 1, wherein the assigning the service information is triggered by a content services network assigning the MBS service ID.

4. The method of claim 1, further comprising performing synchronization.

5. The method of claim 1, wherein the assigning the DPID is triggered by the assigning the MCID or internal configuration triggers.

6. The method of claim 1, wherein the assigning the DPID is triggered by a content services network upon being ready to transmit the MBS packet flow.

7. The method of claim 1, further comprising assigning a logical channel identifier (LCID) to the MBS content in the MBS packet flow.

8. A method of processing a multicast and broadcast service (MCBCS) packet flow in an access services network gateway, the method comprising:

receiving the MBS packet flow;

receiving a MBS content ID associated with a MBS content in the MBS packet flow;

assigning a MBS service ID associated with the MBS packet flow;

assigning a multicast connection ID (MCID) to the MBS packet flow, wherein the MCID has a 1:1 correspondence with the MBS service ID; and assigning a data path ID (DPID) to the MBS packet flow.

9. The method of claim 8, further comprising creating a data path.

10. The method of claim 8, wherein the assigning the MCID is triggered by a content services network.

11. The method of claim 8, further comprising performing synchronization.

12. The method of claim 8, wherein the assigning the DPID is triggered by the assigning the MCID or by internal configuration triggers.

13. The method of claim 8, wherein the assigning the DPID is triggered by a content services network upon being ready to transmit the MBS packet flow.

14. The method of claim 8, further comprising assigning a logical channel identifier (LCID) to the MBS content in the MBS packet flow.

15. A method of processing a multicast and broadcast service (MCBCS) packet flow in a content services network gateway, the method comprising:

receiving one or more content flows;

receiving one or more MBS content IDs associated with the one or more content flows;

grouping the one or more content flows into a first group of content flows;

assigning a MBS service ID associated with the first group of content flows;

assigning a multicast connection ID (MCID) to the first group of content flows, wherein the MCID has a 1:1 correspondence with the MBS service ID;

creating packets comprising the first group of content flows; and transmitting the packets to an access services network.

16. The method of claim 15, further comprising transmitting a trigger indicating that the MBS service ID has been created.

17. The method of claim 15, further comprising transmitting a trigger indicating that the packets are prepared.

18. The method of claim 15, further comprising performing synchronization.

19. The method of claim 15, wherein one or more logical channel identifiers (LCIDs) are associated with the one or more content flows.

* * * * *